United States Patent [19]

Davison et al.

[11] 4,228,790
[45] Oct. 21, 1980

[54] SOLAR HEATER

[76] Inventors: Richard R. Davison, 303 Crescent; William B. Harris, Rte. 3, Box 293 A, both of Bryan, Tex. 77801; Salomon Maldonado, 2314 Louis Pl., Harlingen, Tex. 78550

[21] Appl. No.: 757,956

[22] Filed: Jan. 10, 1977

[51] Int. Cl.³ .............................................. F24J 3/02
[52] U.S. Cl. ..................................... 126/444; 126/426
[58] Field of Search ............... 126/270, 271, 426, 444

[56] References Cited
U.S. PATENT DOCUMENTS

| | | | |
|---|---|---|---|
| 2,445,350 | 7/1948 | Ginnings | 126/271 |
| 3,022,781 | 2/1962 | Andrassy | 126/271 |
| 3,039,453 | 6/1962 | Andrassy | 126/271 |
| 3,513,828 | 5/1970 | Masters | 126/271 |
| 3,859,980 | 1/1975 | Crawford | 126/271 |
| 3,918,430 | 11/1975 | Stout | 126/271 |
| 4,014,314 | 3/1977 | Newton | 126/271 |
| 4,080,955 | 3/1978 | Sandstrom | 126/271 |

FOREIGN PATENT DOCUMENTS 2307233  5/1976  France ...................................... 126/271

*Primary Examiner*—Carroll B. Dority, Jr.
*Attorney, Agent, or Firm*—Michael L. Parks

[57] ABSTRACT

A Solar Heater for collecting solar radiation in a fluid having a base, a flexible fluid retaining member connected adjacent the base for retaining a fluid, and for collecting the radiation of the sun, expansion limiting members connected to the base and positioned with respect to the flexible fluid retaining members for limiting the expansion of the flexible fluid collecting member, as a fluid is flowed through said flexible fluid retaining members by introducing the fluid through a flow way for flowing the fluid therein and a flow way for flowing the fluid therefrom.

10 Claims, 14 Drawing Figures

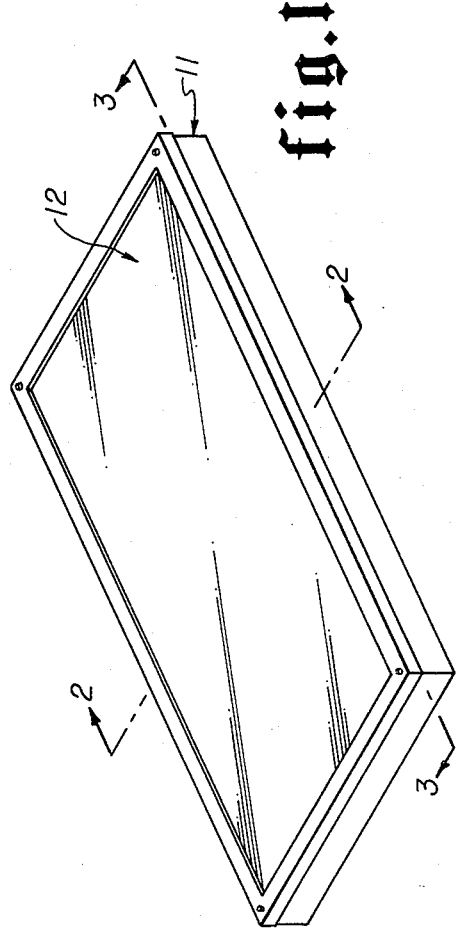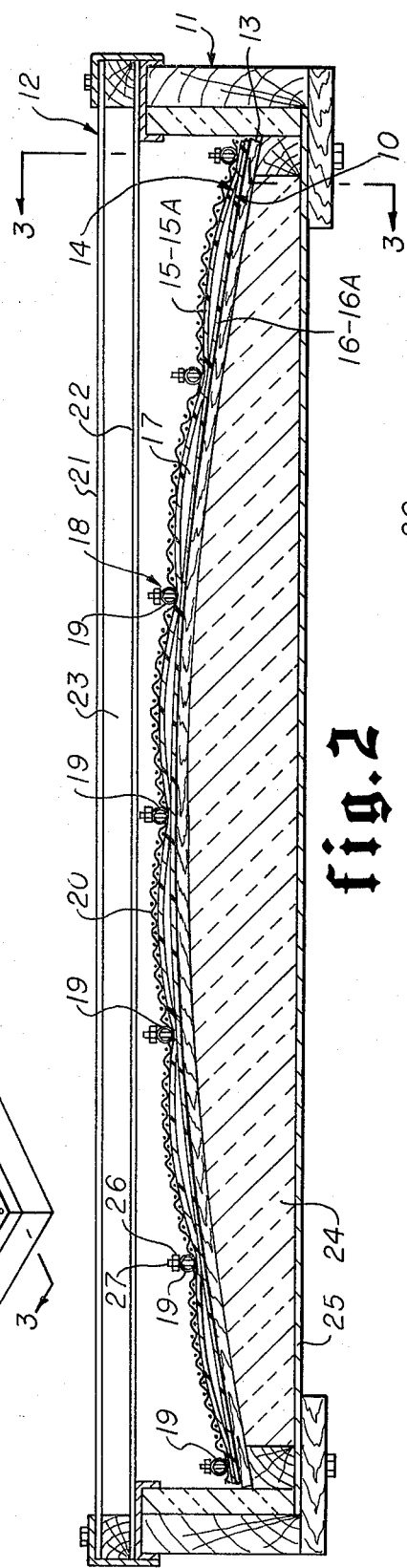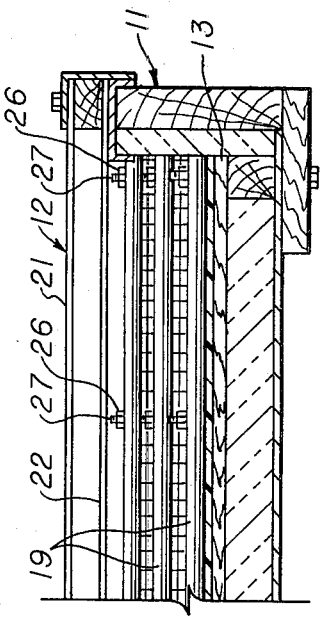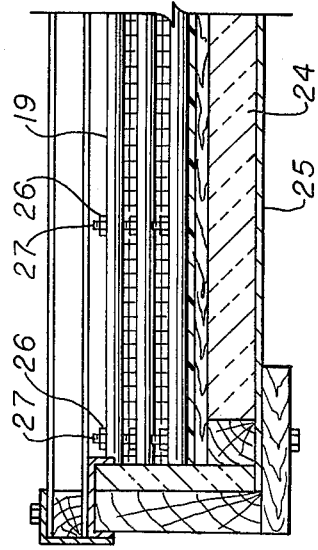

SOLAR HEATER

BACKGROUND OF THE INVENTION

This invention is related to a new solar heater for collecting the radiant energy of the sun in a fluid. While solar heaters are old in the art, this invention relates to an economical and efficient solar heater which is relatively inexpensive and which has freezing and corrosion resistant properties.

The prior art has many forms of solar heaters, however, none has been developed which allows for efficient use of the solar heaters without the heaters being very troublesome and expensive.

Some prior art heaters using fixed plates, while being efficient, have had corrosion problems which clog the system and eventually destroy the solar heaters efficiency. Many in the prior art have attempted to resolve the corrosion problem by using corrosion inhibitors in the fluid used to collect the heat and/or by using coating on the fixed plates. The coatings, however, interfere with the most efficient transfer of heat and thus create yet another problem.

Another problem in some of the prior solar heaters which use water as the fluid vehicle for carrying the energy collected, is that the heaters must be drained during the winter nights because the water freezes and bursts the heaters. When antifreeze is added to prevent freezing and/or corrosion inhibitors are added, then the water must be passed through a heat exchanger which would transfer the heat to a separate palatable water supply to be used by humans. This step heat transfer is highly inefficient.

While the prior art has developed cheap solar heaters using flexible plastic bags, these bags are not highly efficient because they tend to expand or balloon and form relatively thick cross sections of water which are not easily heated. Also, the bags tend to allow the collection of air bubbles which reduce the heat transfer. Also, these bags cannot be tilted upward for maximum incidence with the sun because of the hydrostatic head which is created at the lowest point in the bag causing ballooning or expansion which results in a loss in efficiency. Thus the prior art has struggled with the problem of preventing ballooning while trying to get maximum water in contact with the heated surface.

Also, when flexible plastic bags of the prior art are laid upon a flat surface instead of being elevated to prevent ballooning, several other problems are created. One such problem is that the flat plastic bags are hard or difficult to drain and if the heated water is not drained then the heat is lost because it never reaches the storage tank. Yet another problem is that when the flexible plastic bag is flat the maximum incidence with the sun cannot be obtained and thus a loss of efficiency in the system occurs.

For example, U.S. Pat. No. 3,513,828 attempted one solution to obtain a solar heater for installation at an inclined surface for maximum incidence with the sun and yet prevent the ballooning effect by providing partitions which collect the water and then redistribute it thus reducing the effective hydrostatic head of the whole heater to just that from partition to partition. This heating is not highly efficient because so much of the heated surface is not in contact with the water.

Also in the prior art, when rigid panels were used so that a relatively thin sheet of water could be heated and kept in contact with the back side of the heated surface, the panels had to be very thick to have sufficient strength to keep from ballooning. With thick panels there is a very poor heat transfer and thus a loss in efficiency.

Another problem with the prior art is that of channelling in the Solar Panels, which means that water flows evenly in some places in the Solar Panel and not at all in others which thus reduces the efficiency of the Solar Heater. The prior art has tried to solve this problem by designing many narrow restricted flow ways in the Solar Heater for more even distribution but this is expensive and impractical.

OBJECTS OF THE INVENTION

It is an object of this invention to provide a solar heater which does not have a corrosion problem.

It is an object of this invention to provide an efficient Solar Heater.

It is yet another object of this invention to provide a solar heater which can use one pass water so that the heated water can be used for human consumption.

It is a further object of this invention to provide a solar heater which does not need to be drained at night during cold weather because the solar heater is flexible and expandable and can expand as ice forms without bursting solar heater. Also this solar heater returns automatically to service at daylight by melting the ice and no special works are needed on the solar panel to get it back in service.

It is also an object of this invention to provide a solar heater which operates more efficiently because a heat exchanger is not needed to prevent contamination of potable water with corrosion control chemicals or antifreezes.

Also it is an object of this invention to provide a solar heater which has a relatively thin flexible solar heat collecting surface for good, efficient heat transfer there through to the water.

Also it is an object of this invention to provide a bag type solar heater which can be inclined and still maintain a relatively thin water cross-section and not balloon.

Also the solar panels of this invention are tiltable because the hydrostatic head of the water is not a problem and thus efficiency of the heater is improved because of providing optimum incidence of the solar heater to the sun. It is also an object of this invention to provide a Solar Heater which is easy to drain so that all the energy collected may be stored.

Also it is an object of this invention to provide a solar panel which is inexpensive and cheap to build, repair and which has a long life.

It is yet another object of this invention to provide a solar panel which prevents the collection of air bubbles.

Other features, objects and advantages of the invention will become more readily apparent from the accompanying drawings, specifications and claims.

DESCRIPTION OF THE DRAWINGS

FIG. 1 is a perspective view of the solar heater of this invention completely assembled.

FIG. 2 is a cross-sectional view of the solar heater of this invention taken transversally through the mid-section of a solar heater.

FIG. 3 is a cross-sectional view of the solar heater of this invention taken longitudinally through the end of a solar heater.

Figure 4:
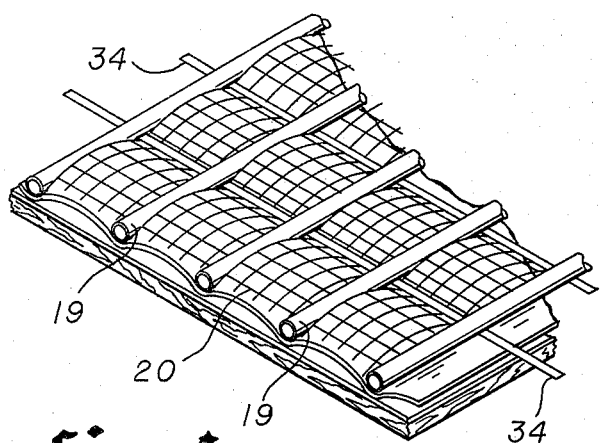
FIG. 4 is a perspective view of one embodiment of the solar heater of this invention using rigid members, steel bands and wire mesh grid material as expansion limiting members.

Referring more particularly to the detailed specification of the solar panel of this invention, it can be seen in FIG. 1 that the solar panel of this invention is generally referred to at numerical reference 10. The solar panel 10 of this invention is generally housed in housing 11 which is provided with a cover 12 for allowing sunlight to pass therethrough and as will be discussed later to provide a dead space above the solar panel 10, which helps retain the solar heat.

The solar panel 10 contained within the housing 11 and under cover 12 is formed on a base 13 which at least in this embodiment is in a convexed configuration. A flexible fluid retaining member 14 is connected adjacent the base 13 for retaining fluids in the solar heater of this invention and for collecting the heat energy of the sun. A fluid is flowed within the flexible fluid retaining member 14 to allow the fluid to pick up the heat transferred to the flexible fluid retaining member 14 by the solar radiation. In at least one embodiment the flexible fluid retainer 14 is a flexible plastic bag having a 1st flexible fluid retaining member 15 and a 2nd flexible fluid retaining member 16. A passage 17 is formed between the 1st and 2nd flexible fluid retaining members 15 and 16 for the flow of the fluid therethrough. As the fluid flows between 1st flexible fluid retaining member 15 and 2nd flexible fluid retaining member 16, it exerts pressure which tends to balloon the flexible fluid retaining member 14 unless some member is provided to prevent this ballooning. An expansion limiting member 18 is provided in this invention to prevent ballooning and in this embodiment it is formed of rigid members 19 which are spaced across the surface of the 1st and 2nd flexible fluid retaining members 15 and 16. Also in this embodiment an additional expansion limiting member 18 such as a mesh grid material 20 may be provided to further aid in the limiting of the expansion of 1st and 2nd flexible fluid retaining members 15 and 16. In at least this embodiment, as shown in FIGS. 1 and 2, a cover 12 is positioned above the base 13 and the 1st and 2nd flexible fluid retaining members 15 and 16. The cover 12 is formed of at least a 1st sheet 21 of a material which allows the radiant energy of the sun to pass therethrough and deposit its energy on the flexible fluid retaining member 14. In yet other embodiments at least a 2nd sheet 22 is provided for allowing the sun's energy to pass therethrough and also for providing an additional insulating barrier between the heat deposited on the flexible fluid retaining member 14 and the outer surface of the 1st sheet 21. While it is not absolutely necessary that the cover 12 be utilized in this invention, improved results are obtained when one or more sheets of cover, such as 1st and 2nd sheet 21 and 22, are used. The reason improved results are obtained is that an air space 23 is formed between 1st sheet 21 and 2nd sheet 22 giving a substantial rise in temperature and improved efficiency of this invention. It should also be understood that each additional sheet thereafter improves the effectiveness of this invention until the number of sheets begins to adversely affect the transmission of the radiant energy therethrough the sheets.

The convex base 13 of this invention is mounted over insulating material 24 to provide a thermal barrier to the ambient temperature. Also a moisture barrier 25 is provided to maintain the insulating properties of the insulating material 24.

Two embodiments may be shown by the use of FIG. 2 where the 1st flexible fluid retaining member 15 and 2nd flexible fluid retaining member 16 are made of different types of material. In one such embodiment 2nd flexible fluid retaining member 16 may serve as the heat collecting member when positioned below 1st flexible fluid retaining member 15 and when material of the 1st flexible fluid retaining member 15 is a transparent or translucent member, which thus allows the radiant energy of the sun to pass through the 1st flexible fluid retaining member 15 and strike the 2nd flexible fluid retaining member 16 where the radiant energy is converted to heat.

However, in an embodiment where the 1st flexible fluid retaining member 15A is not transparent then the function of collecting the radiant energy of the sun shifts to the 1st flexible fluid retaining member 15A and 2nd flexible fluid retaining member 16A only retains the fluid. In either of these embodiments the expansion limiting members 18 are formed of rigid members 19 which are spaced across the surface of the 1st and 2nd flexible fluid retaining members 15 and 16 or 15A and 16A. Also in some embodiments the cover 12 is positioned above the base 13 and the 1st and 2nd flexible fluid retaining members 15 and 16 or 15A and 16A for the improved efficiency above mentioned.

Also the base 13 in this embodiment is convexed to give compression strength to the base 13 when fluid is flowed in the solar panel 10. Without additional reinforcing, or the use of a convexed base 13, the pressure exerted by the fluid on the surface of 1st and 2nd flexible fluid retaining members 15 and 16 or 15A and 16A would tend to cause the edges of the base 13 to roll up. The problem created by allowing the edges to excessively roll up is that the expansion limiting members 18 lose the ability to limit expansion and ballooning occurs in the solar panel 10.

In FIG. 3 it can be seen that the expansion limiting members 18, in some embodiments, are fastened by nuts 26 and bolts 27 to a position adjacent 1st and 2nd flexible fluid retaining members 15 and 16 or 15A and 16A and the base 13. Thus as shown in FIG. 3 as fluid flows in the passage 17 the expansion limiting member 18 and the 1st and 2nd flexible fluid retaining members 15 and 16 or 15A and 16A tend to restrict the amount of expansion that can occur in the 1st and 2nd flexible fluid retaining members 15 and 16 or 15A and 16A.

As is shown in FIG. 4 in yet another embodiment of this invention, the 1st and 2nd flexible fluid retaining members 15 and 16 or 15A and 16A can be limited in its expansion by combining the 1st and 2nd flexible fluid retaining members 15 and 16 or 15A and 16A and rigid members 19 with a wire mesh grid 20 to further provide a limited expansion of the 1st and 2nd flexible fluid retaining members 15 and 16 or 15A and 16A which in turn provides a relatively constant space between the 1st and 2nd flexible fluid retaining members 15 and 16 or 15A and 16A of this solar heater. The benefit of providing the relatively constant space 17 between 1st and 2nd flexible fluid retaining members 15 and 16 or 15A and 16A is that the fluid flowing there through may be flowed through at a somewhat elevated pressure without ballooning. This ability allows the flexible fluid retaining members 15 and 16 or 15A and 16A to be tilted upward without ballooning and because the fluid at elevated pressure is in contact with the said members 15 and 16 or 15A and 16A no air pockets may collect and cause a decrease in the thermal transfer.

Figure 5:
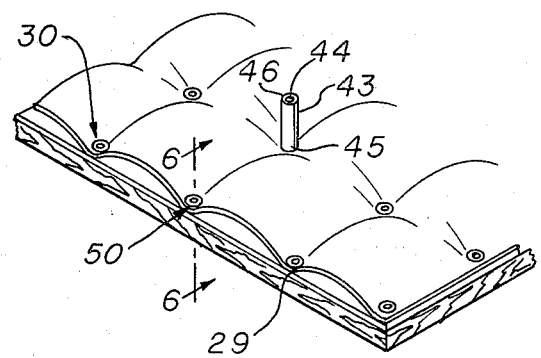
FIG. 5 is a perspective view of one embodiment of the solar heater of this invention using welds of the flexible fluid retaining means and nails as expansion limiting members.
Figure 8:
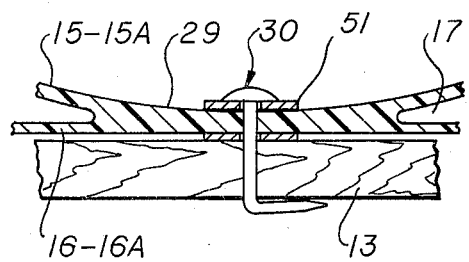
FIG. 8 is a cross section of an embodiment using a weld between the flexible fluid retaining members and a nail and wire grid as an expansion limiting means of this invention.
Figure 14:
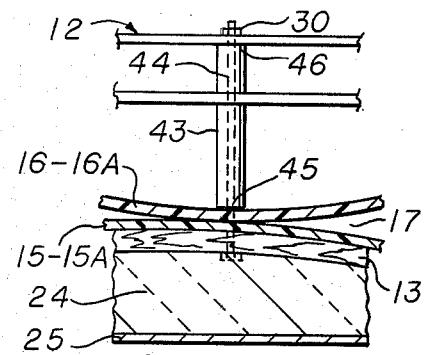
FIG. 14 is a cross-sectional view of one embodiment of the Solar Heater of this invention having the elongated spool-like spindle for supporting the cover.

Also in one embodiment as best shown in FIGS. 5 and 8, an expansion limiting member 50 and 51 may be formed by a weld 29 being made on the 1st and 2nd flexible fluid retaining members 15 and 16 or 15A and 16A at selected points for sealing in said fluid and then a fastener 30, such as a nail, is driven through the weld 29 into the base 13 to form expansion limiting means. If additional expansion limiting means are desired or required, mesh grid material 20, as shown in FIG. 4, may be placed over the flexible fluid retaining member 15 and 16 or 15A and 16A for being secured as the fastner 30 is put into the base 13. Further in such embodiments a spindle 43 like the spindle in a spool of thread, but somewhat elongated, may be provided for supporting the cover 12, as shown in FIGS. 5 and 14. These spindles 43 are mounted on the surface of the 1st and 2nd flexible fluid retaining members 15 and 16 or 15A and 16A by the fasteners 30 being passed through an aperature 44 of the spindle 43 as said fasteners are fastened to the base 13 for providing the expansion limiting function above described. Thus when the fasteners 30 are fastened, the spindles 43 are rigidly mounted for supporting the cover 12 thereabove. It should be understood that should the base 13 have a contoured surface, such as a convex surface, that one end 45 of the spindle adjacent the 1st and 2nd flexible fluid retaining members 15 and 16 or 15A and 16A may need to be contoured to match the convex surface and the other end 46 of the spindle may be relatively flat for supporting the cover 12. It should be further understood that when the spindle 43 is fastened to the 1st and 2nd flexible fluid retaining members 15 and 16 or 15A and 16A a sealing effect is produced by the end 45 of the spindle 43 being drawn down tightly on the flexible fluid retaining member 15 and 16 or 15A and 16A. Thus in this embodiment when the fastener 30, 1st and 2nd flexible fluid retaining members 15 and 16 or 15A and 16A and spindles 43 are connected together the solar panel of this invention is ready for use. This one step assembly process makes for a very inexpensive solar panel. Also the fastener 30 may be passed through the cover 12 should a rigid connection be desired to hold cover 12 rigidly in place, as shown in FIG. 14.

In yet another inexpensive model, only a fastener 30 may be driven through the flexible fluid retaining members 15 and 16 or 15A and 16A to form the expansion limiting members 50 by having the fasteners 30 evenly spaced over the surface of 1st and 2nd flexible fluid retaining members 15 and 16 or 15A and 16A, as shown in FIG. 5.

Figure 7:
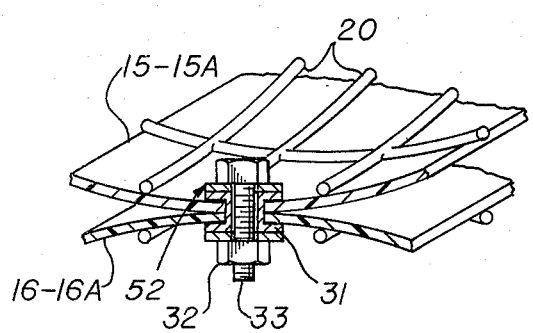
FIG. 7 is a cross-section view of a grommet seal in place in the fluid retaining members where the base is formed of grid materials.

In yet other embodiments as shown in FIG. 7, expansion limiting member 52 may be formed by placing a gromet 31 through the 1st and 2nd flexible fluid retaining members 15 and 16 or 15A and 16A with bolt 33 placed through gromet 31 and a nut 32 fastened down on the gromet 31 to seal the 1st and 2nd flexible fluid retaining members 15 and 16 or 15A and 16A from losing fluid. Also in this embodiment, wire mesh 20 may be used to form part of the expansion limiting member 52 by placing the wire mesh 20 over the 1st and 2nd flexible fluid retaining members 15 and 16 or 15A and 16A and fastening the wire mesh 20 down with the bolts 32.

Figure 6:
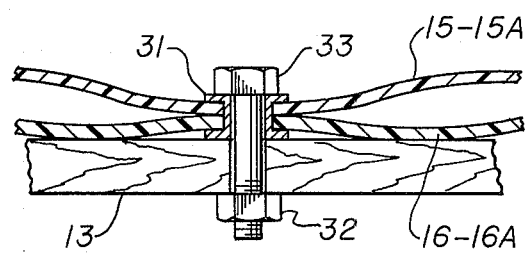
FIG. 6 is a cross-section view of a grommet seal and a nut and bolt used to prevent expansion or ballooning of said Solar Heaters.

In yet another embodiment of this type in FIG. 6 the nut 32 and bolt 33 also are fastened down on the base 13 which can be plywood or any other such material to form a seal and this alone may provide a sufficient expansion limiting function if said bolts are sufficiently close together. Also within the contemplation of this embodiment the mesh grid material 20 may be used as expansion limiting member 18 with the base 13, when a base 13 such as plywood or other material is not used, as shown in FIG. 7.

Figure 9:
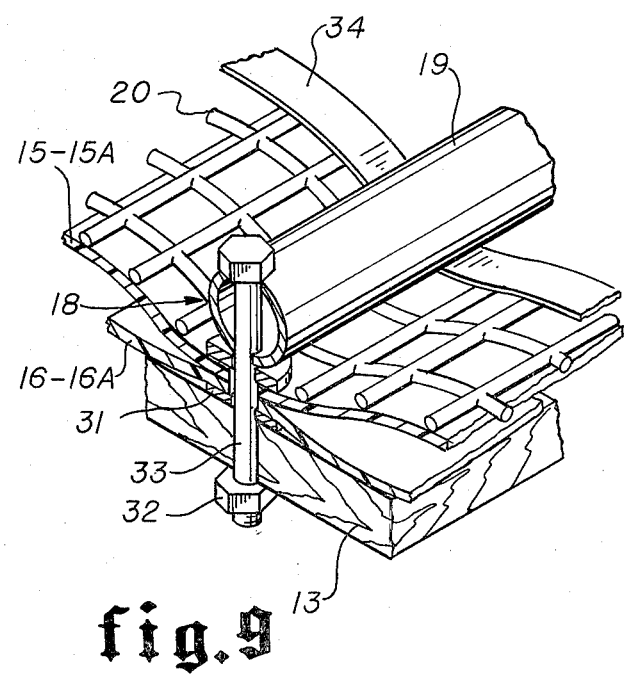
FIG. 9 is a perspective sectional view of an embodiment using the rigid member nuts, bolts, steel bands and wire mesh for expansion limiting members in this embodiment of this invention.

Also in yet other embodiments, a steel band 34 such as shown in FIG. 4 and FIG. 9 may be used to give additional limitation to the expansion of 1st and 2nd flexible fluid retaining members 15 and 16 or 15A and 16A to prevent ballooning in combination with the rigid member 19 and wire mesh 20.

It should be understood that the amount and spacing of expansion limiting members 18 formed from steel bands 34, rigid member 19, mesh grid material 20, etc. is in relation to the strength of the 1st and 2nd flexible fluid retaining members 15 and 16 or 15A and 16A which are used because if the strength of 1st and 2nd flexible fluid retaining members 15 and 16 or 15A and 16A are great, and the pressure elevated, the space between expansion limiting member 18 may be greater. Where the strength of 1st and 2nd flexible fluid retaining members 15 and 16 or 15A and 16A is limited, or the pressure of the 1st and 2nd flexible fluid retaining members 15 and 16 or 15A and 16A is elevated, then the space between expansion limiting means 18 is smaller to compensate for the lack of strength of 1st and 2nd flexible fluid retaining members 15 and 16 and 15A and 16A to limit the expansion of the fluid therein.

Also it should be understood that since the 1st and 2nd flexible fluid retaining members 15 and 16 or 1st and 2nd flexible fluid retaining members 15A and 16A are flexible even with the expansion limiting member 18, that sufficient expansion can occur to allow for freezing of the fluid without bursting the 1st and 2nd flexible fluid retaining members 15 and 16 or 15A and 16A and thus this solar heater does not have to be drained during the night if the temperature drops below the freezing point of the fluid.

Figure 11:
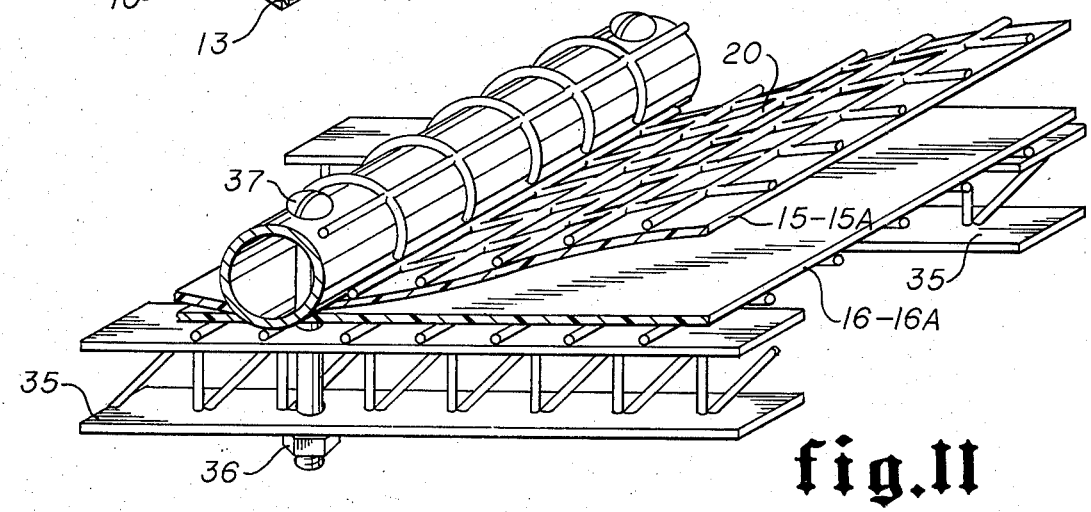
FIG. 11 is a cross-sectional view of another embodiment of a base and another embodiment of the expansion limiting member formed from a bolt, grommet, wire mesh grid and rigid members used to prevent expansion or ballooning of the solar heater of this invention.
Figure 12:
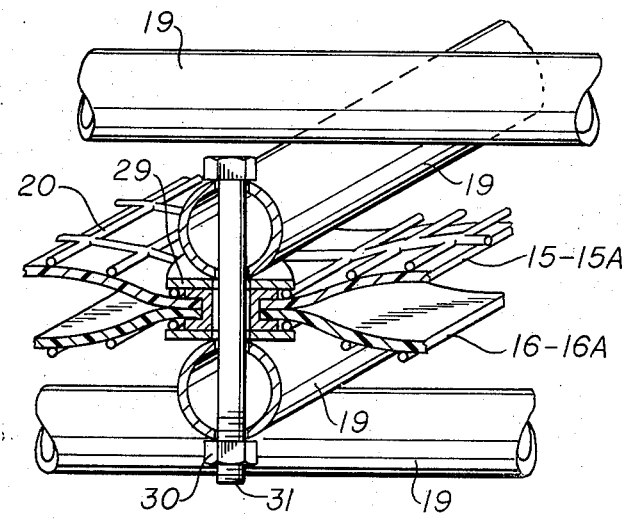
FIG. 12 is a cross-sectional view of another embodiment using rigid members for a base and expansion limiting members.

Further the base 13 of this invention can be a solid base such as plywood, metal, etc., or it may be only expansion limiting member 18, providing the expansion limiting means 18 are sufficiently anchored as shown in FIGS. 12 and 11 to prevent the fluid pressure from causing the expansion limiting materials 18 and 1st and 2nd flexible fluid retaining members 15 and 16 or 15A and 16A from ballooning.

Figure 10:
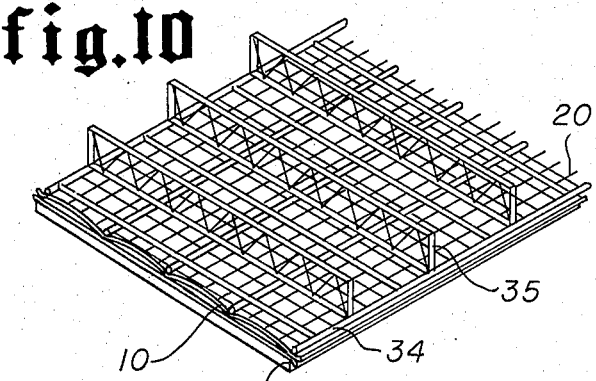
FIG. 10 is a perspective view of another embodiment of the solar heater of the invention with rigid members capable of supporting a cover for the solar heater.

For example, a Truss 35 is shown in FIGS. 10 and 11 which has anchored to it the rigid member 19, which then has mesh grid material 20 anchored to said rigid member 19 to prevent expansion of 1st and 2nd flexible fluid retaining members 15 and 16 or 15A and 16A from ballooning. Also the Trusses 35 are positioned at right angles to the rigid member 19, and they are fastened together by nuts 36 and bolts 37 to give sufficient strength to the frame to resist the force caused by the fluid, which tends to balloon the 1st and 2nd flexible fluid retaining members 15 and 16 or 15A and 16A.

In FIG. 12 it can be seen that rigid member 19 may be substituted for Trusses 35 if they are run across each other and are strong enough to resist the force created when the fluid is flowed in the solar panel 10.

Figure 13:
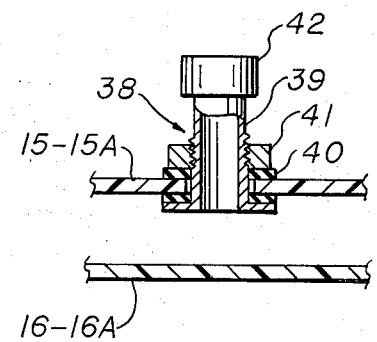
FIG. 13 is a cross-sectional view of a flow way for flowing fluid into or out of the Solar Heaters of this invention.

In FIG. 13 a flow way 38 is shown in fluid communication with the 1st and 2nd flexible fluid retaining members 15 and 16 or 15A and 16A. This flow way 38 may be used in combination with another one just like it to provide 1st flow way for flowing fluid into said 1st and 2nd flexible fluid retaining members 15 and 16 or 15A and 16A and a 2nd flow way for flowing a fluid from the 1st and 2nd flexible fluid retaining members 15 and 16 and 15A and 16A.

The flow way 38 is formed in at least one embodiment by the insertion of a valve stem 39 through one or the other of the 1st or 2nd flexible fluid retaining members 15 and 16 or 15A and 16A and then inserting a rubber washer 40 about the valve stem 39. Then a nut 41 is screwed about the valve stem 39 and down onto the rubber washer 40 to form a seal. Any standard type of connector for a water feed may then be attached to the other end 42 of valve stem 39 for either flowing fluid therein or out of 1st and 2nd flexible fluid retaining members 15 and 16 or 15A and 16A.

The foregoing disclosure and description of the invention is illustrative and explanatory thereof, and various changes in the size, shape and materials as well as in the details of the illustrated construction may be made within the scope of the appended claims without departing from the spirit of the invention.

We claim:

1. A solar heater for collecting solar radiation in a fluid comprising:
   (a) a base
   (b) a 1st flexible fluid retaining means connected adjacent said base for collecting solar radiation
   (c) a 2nd flexible fluid retaining means for retaining fluid
   (d) Fixed spacer means connected to said base through said 1st and 2nd flexible fluid retaining means at spaced intervals for forming a seal and for limiting the expansion of said 1st and 2nd flexible fluid retaining means connected adjacent said base for collecting solar radiation
   (e) a first flow way means connected in fluid communication with said 1st and 2nd flexilbe fluid retaining means for flowing fluid therein; and
   (f) a second flow way means connected in fluid communication with said 1st and 2nd flexible fluid retaining means for flowing fluid therefrom.

2. A Solar Heater for collecting solar radiation in a fluid as in claim 1 wherein said seal includes a spot weld between said 1st and 2nd flexible fluid retaining means at selected points for sealing in said fluid and said fixed spacer means means includes a nail driven into said Base.

3. A Solar Heater for collecting solar radiation in a fluid as in claim 1 further comprising a cover means and said fixed spacer means is connected to said base for providing supports for said cover means.

4. A Solar Heater for collecting solar radiation in a fluid as in claim 3 wherein said fixed spacer means includes an elongated spool-like spindle having an aperture there through for passing a fastener means there through for fastening said spindle to said base.

5. A Solar Heater for collecting solar radiation in a fluid comprising:
   (a) a base;
   (b) a 1st flexible fluid retaining means connected adjacent said base for collecting solar radiation;
   (c) a second flexible fluid retaining means for retaining fluid;
   (d) an expansion limiting means including a grid positioned across said first and second flexible fluid retaining means and connected to said base at spaced intervals to provide a relatively constant space between said first and second flexible fluid retaining means when said space is filled with fluid;
   (e) a first flow way means connected in fluid communication with said 1st and 2nd flexible fluid retaining means for flowing fluid therein, and
   (f) a second flow way means connected in fluid communication with said 1st and 2nd flexible fluid retaining means for flowing fluid therefrom.

6. A Solar Heater for collecting solar radiation in a fluid of claim 5, wherein said expansion limiting means further comprising a flexible reinforcing grid material connected to said base and positioned adjacent said flexible fluid retaining means for limiting the expansion of said flexible fluid retaining means to a relatively constant space between said flexible retaining means when said space is filled with said fluid.

7. A Solar Heater for collecting solar radiation in a fluid of claim 6 wherein said flexible reinforcing grid material connected to said base is a wire mesh and said mesh is positioned on said flexible fluid retaining means for limiting the expansion of said flexible fluid retaining means to a relative constant space between said flexible fluid retaining means when said space is filled with fluid.

8. A Solar Heater for collecting solar radiation in a fluid in claim 7 further comprising;
   (a) a housing means for housing said base and said 1st and 2nd flexible fluid retaining means; and
   (b) cover means connected to said housing means for allowing solar radiation therethrough; and for retaining said energy within said housing.

9. A Solar Heater for collecting solar radiation in a fluid as in claim 5 further comprising a housing means connected to said base and a cover means connected to said housing means for covering said base and for allowing solar radiation there through for heating the fluid in the flexible fluid retaining heating means.

10. A Solar Heater for collecting solar radiation in a fluid comprising;
(a) a base formed into a convex shape for preventing said base from being deformed by the pressure of the fluid in said solar heater;
(b) a 1st flexible fluid retaining means connected adjacent said base for collecting solar radiation;
(c) a 2nd flexible fluid retaining means for retaining fluid;
(d) fixed spacer means connected to said base through said 1st and 2nd flexible fluid retaining means at spaced intervals for forming a seal and for limiting the expansion of said 1st and 2nd flexible fluid retaining means connected adjacent said base for collecting solar radiation.

* * * * *